(12) United States Patent
Tamura

(10) Patent No.: US 11,215,204 B2
(45) Date of Patent: Jan. 4, 2022

(54) PISTON UNIT AND HYDRAULIC CYLINDER

(71) Applicant: SMC CORPORATION, Chiyoda-ku (JP)

(72) Inventor: Ken Tamura, Noda (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/644,049

(22) PCT Filed: Jul. 6, 2018

(86) PCT No.: PCT/JP2018/025733
§ 371 (c)(1),
(2) Date: Mar. 3, 2020

(87) PCT Pub. No.: WO2019/049501
PCT Pub. Date: Mar. 14, 2019

(65) Prior Publication Data
US 2020/0248728 A1     Aug. 6, 2020

(30) Foreign Application Priority Data

Sep. 7, 2017   (JP) .............................. JP2017-172265

(51) Int. Cl.
*F15B 15/28*    (2006.01)
*F16J 1/00*     (2006.01)

(52) U.S. Cl.
CPC ........... *F15B 15/2861* (2013.01); *F16J 1/005* (2013.01)

(58) Field of Classification Search
CPC .... F15B 15/2861; F15B 15/1452; F16J 1/005
See application file for complete search history.

(56) References Cited

U.S. PATENT DOCUMENTS

| 3,187,645 | A  | * | 6/1965 | Cope |
| 7,557,568 | B2 | * | 7/2009 | Terasaki .............. F15B 15/2861 324/207.24 |
| 9,062,694 | B2 | * | 6/2015 | Fletcher .............. F15B 15/2861 |

(Continued)

FOREIGN PATENT DOCUMENTS

| CN | 105020202 A | 11/2015 |
| JP | 11-132204 A | 5/1999 |

(Continued)

OTHER PUBLICATIONS

International Search Report dated Oct. 9, 2018 in PCT/JP2018/025733 filed on Jul. 6, 2018, citing documents AQ-AS therein, 1 page.

(Continued)

*Primary Examiner* — F Daniel Lopez
(74) *Attorney, Agent, or Firm* — Oblon, McClelland, Maier & Neustadt, L.L.P.

(57) ABSTRACT

A piston unit is provided with a piston body; a packing mounted on an outer circumferential portion of the piston body; a holding member having a plurality of magnet holding portions that are arranged along a circumferential direction; a plurality of magnets which are held at intervals in the circumferential direction; a first annular yoke disposed on one side in an axial direction of the plurality of magnets; and a second annular yoke disposed on the other side in the axial direction of the plurality of magnets.

9 Claims, 5 Drawing Sheets

(56) References Cited

U.S. PATENT DOCUMENTS

2008/0173169 A1    7/2008   Ikari
2018/0135662 A1    5/2018   Suzuki et al.

FOREIGN PATENT DOCUMENTS

| JP | 2001-234903 A | 8/2001 |
| JP | 2008-133920 A | 6/2008 |
| JP | 2012-2325 A | 1/2012 |
| JP | 2017-3023 A | 1/2017 |
| SE | 443615 B | 3/1986 |

OTHER PUBLICATIONS

Indian Office Action dated Mar. 16, 2021 in Indian Patent Application No. 202047014986 (with English translation), 5 pages.
Search Report dated Apr. 9, 2021 issued in corresponding European patent application No. 18854089.2.

\* cited by examiner

PISTON UNIT AND HYDRAULIC CYLINDER

TECHNICAL FIELD

The present invention relates to piston units having outer circumferential parts in which magnets are disposed, and to fluid pressure cylinders (hydraulic cylinders).

BACKGROUND ART

For example, fluid pressure cylinders including pistons displaced according to supply of pressurized fluid are well known as means for carrying workpieces and the like (actuators). A typical fluid pressure cylinder includes a cylinder tube, a piston disposed inside the cylinder tube to be movable in the axial direction, and a piston rod connected to the piston.

In a fluid pressure cylinder disclosed in Japanese Laid-Open Patent Publication No. 2008-133920, a ring-shaped magnet is attached to an outer circumferential part of a piston, and a magnetic sensor is disposed outside a cylinder tube to detect the position of the piston. In this structure, the magnet has a ring shape (extends around the entire circumference) while the magnetic sensor is disposed on the cylinder tube only at a point in the circumferential direction. That is, the magnet is larger than necessary to detect the position of the piston. On the other hand, a fluid pressure cylinder disclosed in Japanese Laid-Open Patent Publication No. 2017-003023 includes magnets (non-ring-shaped magnets) held in an outer circumferential part of a piston only at certain points in the circumferential direction.

SUMMARY OF INVENTION

In the case where the piston uses the ring-shaped magnet as in Japanese Laid-Open Patent Publication No. 2008-133920, the size of the ring-shaped magnet needs to be changed depending on the cylinder diameter (piston diameter). On the other hand, in the case where the piston uses the magnet disposed only at a point in the circumferential direction as in Japanese Laid-Open Patent Publication No. 2017-003023, a magnetic field cannot be produced outside the piston around the entire circumference.

The present invention has been devised taking into consideration the aforementioned problems, and has the object of providing a piston unit and a fluid pressure cylinder capable of producing a magnetic field around the entire circumference without using a ring-shaped magnet.

To achieve the above-described object, the present invention provides a piston unit reciprocable along a slide hole created in a cylinder tube, the piston unit comprising a piston body, a packing attached to an outer circumferential part of the piston body, a holding member attached to the outer circumferential part of the piston body and including a plurality of magnet holding portions disposed in a circumferential direction, a plurality of magnets held by the plurality of magnet holding portions at intervals in the circumferential direction, a first yoke with a ring shape disposed on one side of the plurality of magnets in an axial direction, and a second yoke with a ring shape disposed on another side of the plurality of magnets in the axial direction.

According to the piston unit configured as above, the plurality of magnets are disposed at intervals in the circumferential direction by the holding member, and the ring-shaped first and second yokes are disposed on either side of the plurality of magnets. Thus, a magnetic field can be produced around the entire circumference of the piston unit without using a ring-shaped magnet. As a result, common magnets can be used for fluid pressure cylinders with different cylinder diameters (piston diameters). That is, the size of the magnets does not need to be changed depending on the cylinder diameter.

It is preferable that each of the plurality of magnets have a shape with a short axis and a long axis that are perpendicular to an axis of the piston body, and be held by the holding member such that the long axis extends in a circumferential direction of the piston body.

This structure eliminates or reduces circumferential unevenness in the magnetic flux density of the magnetic field produced outside the piston unit.

It is preferable that a number of the plurality of magnets be four and that the plurality of magnets be disposed at regular intervals in the circumferential direction.

This structure facilitates production of a magnetic field of which magnetic flux density is uniform in the circumferential direction.

It is preferable that the piston body include a plurality of piston members and that the plurality of piston members form a ring-shaped accommodating groove accommodating the plurality of magnet holding portions, the first yoke, and the second yoke.

This structure enables the ring-shaped first yoke and the ring-shaped second yoke to be easily assembled on either side of the plurality of magnets.

It is preferable that a packing receiving groove, which has a ring shape and to which the packing is attached, be formed in the outer circumferential part of the piston body, that one sidewall of the packing receiving groove be formed by the piston body, and that another sidewall of the packing receiving groove be formed by an outer circumferential part of the first yoke.

This structure facilitates assembly of the ring-shaped packing and reduces the axial dimension of the piston body.

It is preferable that the second yoke include an adjoining portion adjoining the plurality of magnets and an axial portion having a ring shape and protruding from an outer circumferential part of the adjoining portion in the axial direction to be away from the first yoke.

This structure increases the circumferential area of the second yoke to effectively increase the magnetic flux density of the magnetic field produced outside the piston unit.

It is preferable that the holding member be supported by an outer circumferential surface of the axial portion of the second yoke.

This structure enables the holding member to be supported in a preferred manner using the axial portion.

It is preferable that an outer circumferential surface of the first yoke and an outer circumferential surface of the second yoke be located outward from an outer end of each of the plurality of magnets.

This structure effectively increases the magnetic flux density of the magnetic field produced outside the piston unit.

It is preferable that the magnet holding portions each have a cavity opened in an outer circumferential surface of the holding member.

This structure allows the magnets to be disposed at positions close to the inner circumferential surface of the cylinder tube. Since the distance between the magnetic sensor attached to the outside of the cylinder tube and the magnet disposed inside the cylinder tube can be reduced, the magnetic force required for the magnet can be reduced.

Consequently, the axial thickness of the magnets can be reduced, and thereby the axial dimension of the piston unit can be reduced.

It is preferable that the holding member be a wear ring configured to prevent the piston body from coming into contact with the cylinder tube.

Thus, the holding member serves both as the wear ring and a member holding the magnets, leading to simplification of the structure.

Moreover, a fluid pressure cylinder according to the present invention comprises a cylinder tube having a slide hole inside the cylinder tube, a piston unit disposed to be reciprocable along the slide hole, and a piston rod protruding from the piston unit in an axial direction, wherein the piston unit is the piston unit according to any one of the above.

According to the piston unit and the fluid pressure cylinder of the present invention, a magnetic field can be produced around the entire circumference of the piston unit without using a ring-shaped magnet.

The above-described object, features, and advantages will become more apparent from the following description of preferred embodiments in conjunction with the accompanying drawings.

DESCRIPTION OF EMBODIMENTS

Preferred embodiments of a piston unit and a fluid pressure cylinder according to the present invention will be described in detail below with reference to the accompanying drawings.

Figure 1:
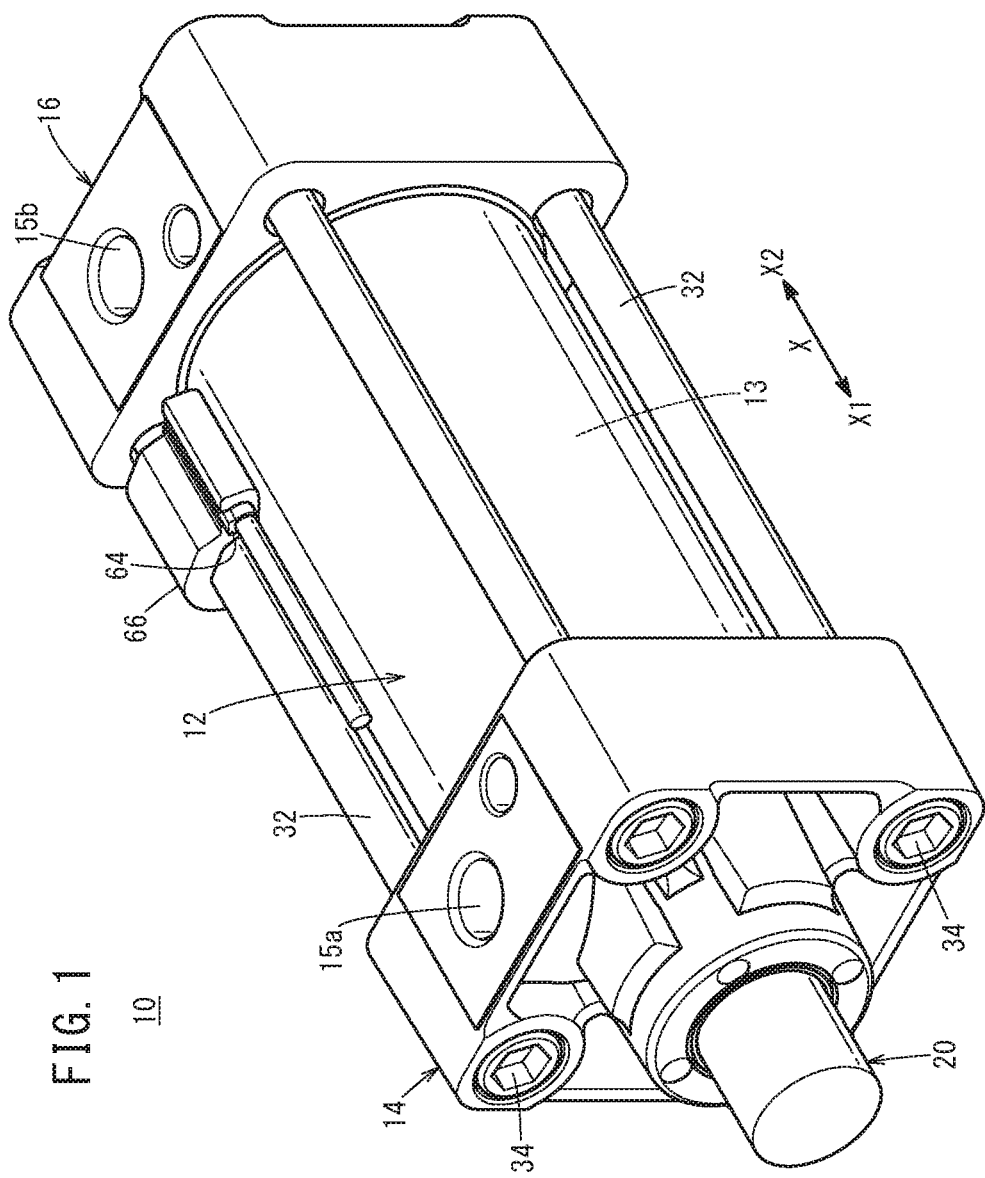
FIG. 1 is a perspective view of a fluid pressure cylinder according to a first embodiment of the present invention.
Figure 2:
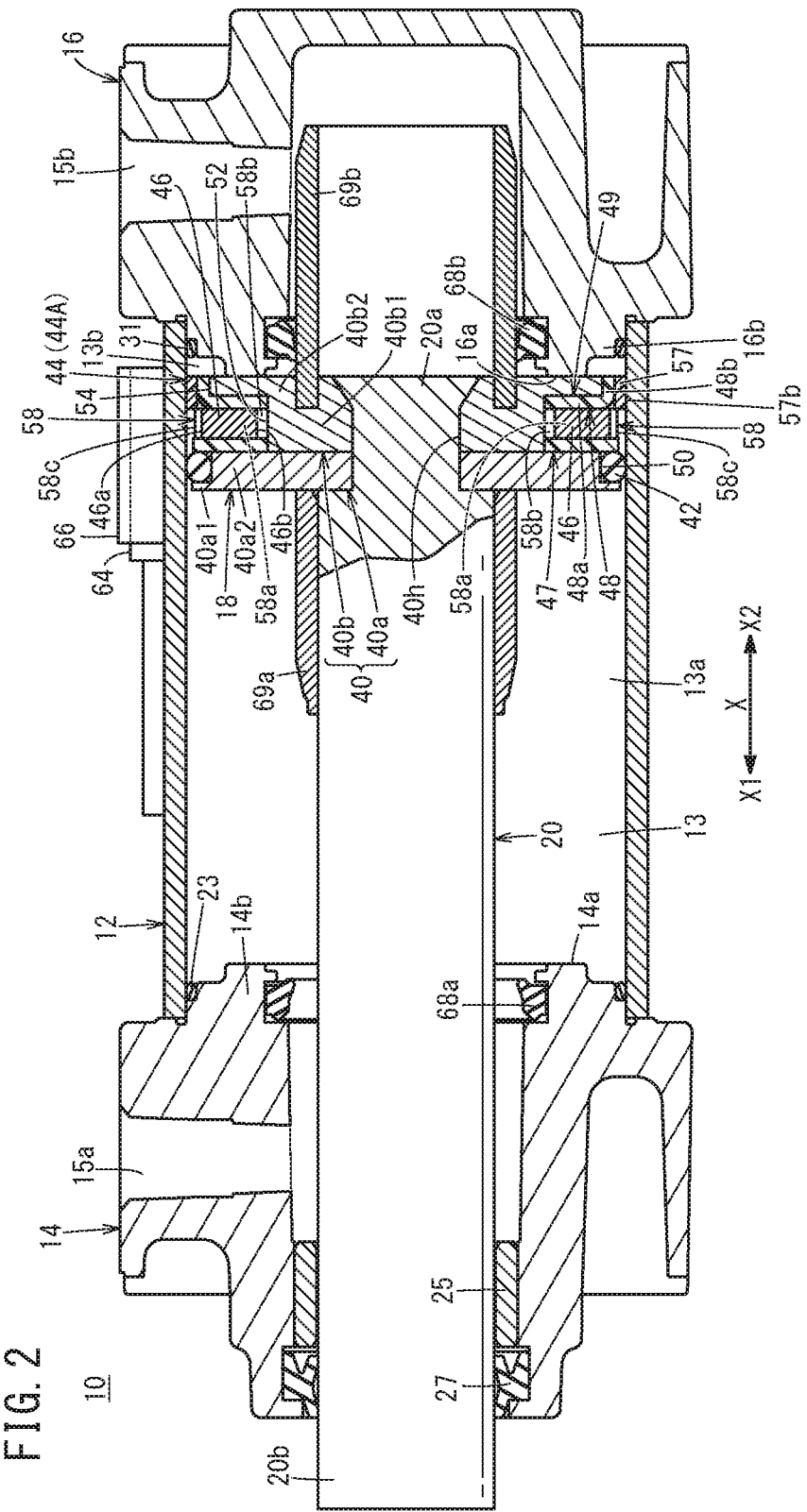
FIG. 2 is a cross-sectional view of the fluid pressure cylinder illustrated in FIG. 1.
Figure 3:
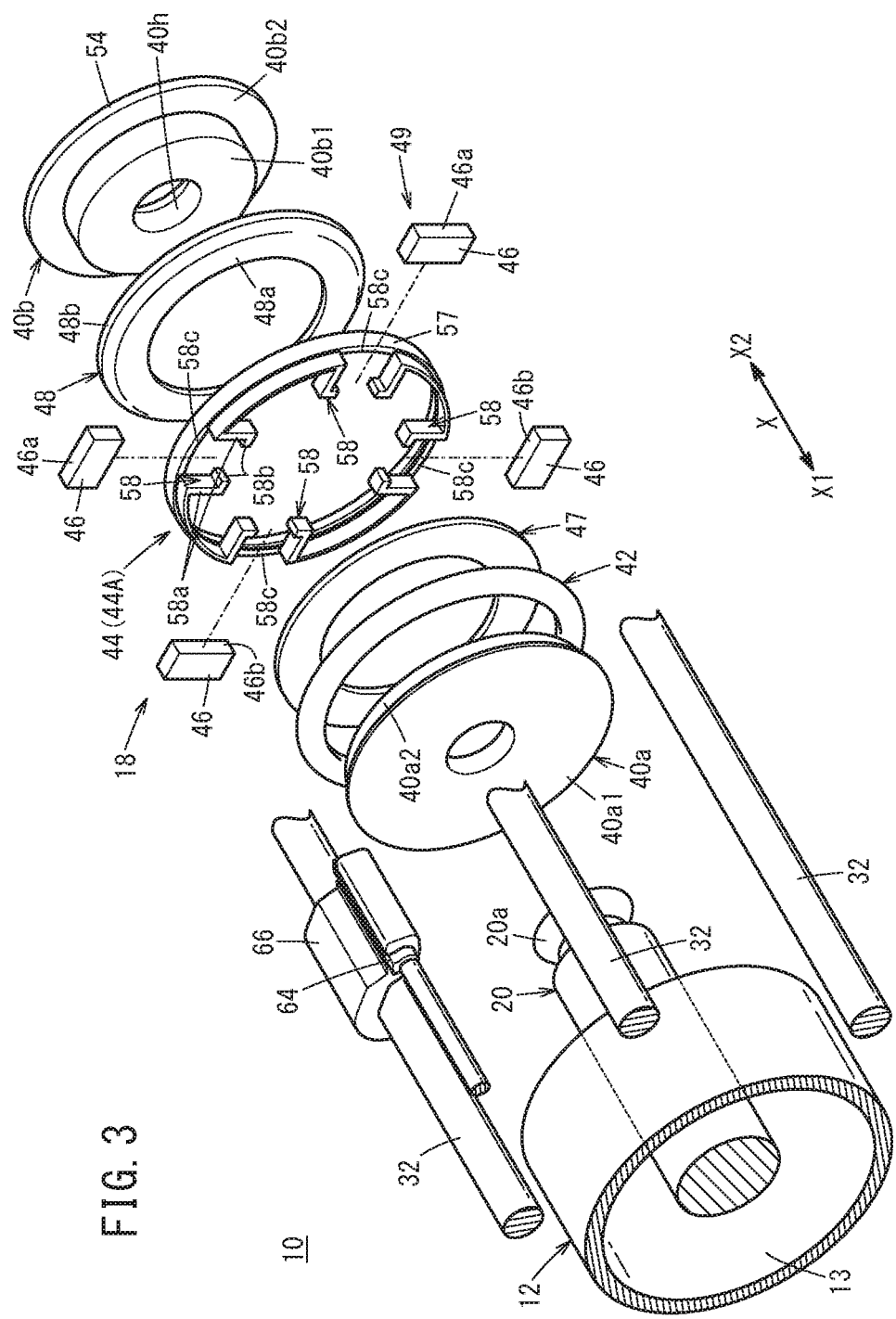
FIG. 3 is an exploded perspective view of the fluid pressure cylinder illustrated in FIG. 1.

A fluid pressure cylinder 10 according to a first embodiment illustrated in FIG. 1 includes a hollow tubular cylinder tube 12 having a circular slide hole 13 (cylinder chamber) inside the cylinder tube 12, a rod cover 14 disposed at one end part of the cylinder tube 12, and a head cover 16 disposed at another end part of the cylinder tube 12. As illustrated in FIGS. 2 and 3, the fluid pressure cylinder 10 further includes a piston unit 18 disposed inside the cylinder tube 12 to be movable in the axial direction (X direction) and a piston rod 20 connected to the piston unit 18. The fluid pressure cylinder 10 is used as an actuator for, for example, carrying a workpiece.

The cylinder tube 12 is a tubular body composed of, for example, a metal material such as aluminum alloy and extends in the axial direction. In the first embodiment, the cylinder tube 12 has a hollow cylindrical shape.

As illustrated in FIGS. 1 and 2, the rod cover 14 is provided to block up the one end part (an end part facing a direction of an arrow X1) of the cylinder tube 12, and is composed of, for example, a metal material similar to the material of the cylinder tube 12. The rod cover 14 has a first port 15a. As illustrated in FIG. 2, an annular protruding portion 14b provided for the rod cover 14 is fitted in the one end part of the cylinder tube 12.

A packing 23 with a circular ring shape is disposed between the rod cover 14 and the cylinder tube 12. A bush with a circular ring shape and a packing 27 with a circular ring shape are disposed in an inner circumferential part of the rod cover 14. A first cushion packing 68a with a circular ring shape is disposed in the inner circumferential part of the rod cover 14.

The head cover 16 is composed of, for example, a metal material similar to the material of the cylinder tube 12 and is provided to block up the other end part (an end part facing a direction of an arrow X2) of the cylinder tube 12. The head cover 16 hermetically closes the other end part of the cylinder tube 12. The head cover 16 has a second port 15b.

An annular protruding portion 16b provided for the head cover 16 is fitted in the other end part of the cylinder tube 12. A packing 31 with a circular ring shape is disposed between the head cover 16 and the cylinder tube 12. A second cushion packing 68b with a circular ring shape is disposed in an inner circumferential part of the head cover 16.

As illustrated in FIG. 1, the cylinder tube 12, the rod cover 14, and the head cover 16 are fastened to each other in the axial direction by a plurality of connecting rods 32 and nuts 34. The plurality of pairs of connecting rods 32 and nuts 34 are disposed at intervals in the circumferential direction. Thus, the cylinder tube 12 is secured while being held between the head cover 16 and the rod cover 14.

As illustrated in FIGS. 2 and 3, the piston unit 18 is accommodated inside the cylinder tube 12 (slide hole 13) to be slidable in the axial direction and partitions the slide hole 13 into a first pressure chamber 13a on the first port 15a side and a second pressure chamber 13b on the second port 15b side. In this embodiment, the piston unit 18 is connected to a base end portion 20a of the piston rod 20.

The piston unit 18 includes a circular piston body 40 protruding radially outward from the piston rod 20, a ring-shaped packing 42 attached to an outer circumferential part of the piston body 40, a holding member 44 attached to the outer circumferential part of the piston body 40 and including a plurality of magnet holding portions 58, a plurality of magnets 46 disposed in the outer circumferential part of the piston body 40, and a first yoke 47 and a second yoke 48 composed of a magnetic material disposed adjacent to the plurality of magnets 46.

The piston body 40 has a through-hole 40h passing therethrough in the axial direction. The base end portion 20a (small diameter portion) of the piston rod 20 is fitted in the through-hole 40h of the piston body 40 and secured (connected) to the piston body 40 by swaging. The piston rod 20 and the piston body 40 may be secured to each other by screwing instead of swaging.

A packing receiving groove 50, a ring-shaped accommodating groove 52, and a yoke supporting surface 54 are formed in the outer circumferential part of the piston body 40 at different axial positions. The ring-shaped accommodating groove 52 is disposed between the packing receiving groove 50 and the yoke supporting surface 54. The packing receiving groove 50 and the ring-shaped accommodating groove 52 each have a circular ring shape extending around the entire circumference in the circumferential direction.

The ring-shaped accommodating groove 52 accommodates the plurality of magnet holding portions 58, the first yoke 47, and the second yoke 48. The groove depth of the ring-shaped accommodating groove 52 is greater than the groove depth of the packing receiving groove 50. Thus, the bottom surface of the ring-shaped accommodating groove 52 is located radially inward from the bottom surface of the packing receiving groove 50.

The piston body 40 includes a plurality of piston members, and the plurality of piston members form the ring-shaped accommodating groove 52. Specifically, in this embodiment, the piston body 40 includes a first piston member 40*a* and a second piston member 40*b* disposed adjacent to each other in the axial direction, and the first piston member 40*a* and the second piston member 40*b* form the ring-shaped accommodating groove 52. That is, the piston body 40 has a structure divided into the first piston member 40*a* and the second piston member 40*b* in the axial direction.

The first piston member 40*a* includes a first large diameter portion 40*a*1 and a first small diameter portion 40*a*2. An outer circumferential part of the first large diameter portion 40*a*1 constitutes one sidewall of the packing receiving groove 50. The outer circumferential surface of the first small diameter portion 40*a*2 constitutes the bottom surface of the packing receiving groove 50. An outer circumferential part of the first small diameter portion 40*a*2 constitutes one sidewall of the ring-shaped accommodating groove 52. An outer circumferential part of the first yoke 47 constitutes another sidewall of the packing receiving groove 50.

The second piston member 40*b* includes a second small diameter portion 40*b*1 and a second large diameter portion 40*b*2. The outer circumferential surface of the second small diameter portion 40*b*1 constitutes the bottom surface of the ring-shaped accommodating groove 52. An outer circumferential part of the second large diameter portion 40*b*2 constitutes another sidewall of the ring-shaped accommodating groove 52.

The constituent material of the piston body 40 (the first piston member 40*a* and the second piston member 40*b*) includes, for example, metal materials such as carbon steel, stainless steel, and aluminum alloy and hard resin. In particular, it is preferable that the piston body 40 be composed of a non-magnetic material so that the magnetic lines of force generated by a magnetic structural portion 49 (described below) are directed to the outside of the piston unit 18 in a preferred manner. The first piston member 40*a* and the second piston member 40*b* may be composed of materials different from each other.

The packing 42 is a ring-shaped seal member (for example, O-ring) composed of an elastic material such as rubber or elastomer. The packing 42 is fitted in the packing receiving groove 50. The packing 42 is in contact with the inner circumferential surface of the cylinder tube 12 to be slidable. Specifically, the packing 42 airtightly or fluid tightly adheres to the inner circumferential surface of the cylinder tube 12 and the outer circumferential surface of the piston body 40 around the entire circumference. The packing 42 seals a gap between the outer circumferential surface of the piston unit 18 and the inner circumferential surface of the slide hole 13 to airtightly or fluid tightly separate the first pressure chamber 13*a* and the second pressure chamber 13*b* from each other inside the slide hole 13.

The holding member 44 includes a ring-shaped circumferential portion 57 extending in the circumferential direction along the outer circumferential part of the piston body 40 and the plurality of magnet holding portions 58 protruding from the circumferential portion 57. The circumferential portion 57 is supported by the outer circumferential surface of the second yoke 48. The magnet holding portions 58 are disposed at intervals in the circumferential direction. In this embodiment, four magnet holding portions 58 are disposed at regular intervals in the circumferential direction.

The magnet holding portions 58 are fitted in the ring-shaped accommodating groove 52 of the piston body 40. The magnets 46 are held (fitted) in the respective magnet holding portions 58. The magnet holding portions 58 each have a cavity 58*c* opened in the outer circumferential surface of the holding member 44.

As illustrated in FIG. 3, the magnet holding portions 58 protrude from the inner circumferential surface of the circumferential portion 57 radially inward. More specifically, the magnet holding portions 58 each include a pair of holding arms 58*a* protruding radially inward from the circumferential portion 57. The pair of holding arms 58*a* are separate from each other in the circumferential direction, and one of the magnets 46 is held between the pair of holding arms 58*a*. Each of the holding arms 58*a* is provided at the tip (free end) with an engaging hook 58*b* engaging with the magnet 46. The magnet holding portions 58 may have a U-shaped frame structure including the pair of holding arms 58*a* connected to each other at the tips.

In the first embodiment, the holding member 44 is a wear ring 44A configured to prevent the piston body 40 from coming into contact with the cylinder tube 12, and is attached to the second yoke 48. The wear ring 44A prevents the outer circumferential surface of the piston body 40 from coming into contact with the inner circumferential surface of the slide hole 13 when a large lateral load is applied to the piston unit 18 in a direction perpendicular to the axial direction while the fluid pressure cylinder 10 is in operation. The outer diameter of the wear ring 44A is greater than the outer diameter of the piston body 40.

The wear ring 44A is composed of a low friction material. The friction coefficient between the wear ring 44A and the inner circumferential surface of the slide hole 13 is smaller than the friction coefficient between the packing 42 and the inner circumferential surface of the slide hole 13. Such a low friction material includes, for example, synthetic resins with a low coefficient of friction but a high resistance to wear such as polytetrafluoroethylene (PTFE) and metal materials (for example, bearing steel).

The plurality of magnets 46 are fitted in the plurality of magnet holding portions 58. In this embodiment, four magnets 46 are disposed at regular intervals in the circumferential direction. The number of magnets 46 may be three or less or five or more. Each of the magnets 46 has a shape with a short axis and a long axis that are perpendicular to the axis of the piston body 40, and is held by the holding member 44 such that the long axis extends in the circumferential direction of the piston body 40.

In this embodiment, the magnets 46 have a rectangular parallelepiped shape and disposed such that the long sides of the magnets 46 extend in the circumferential direction of the piston body 40. That is, the short sides of the magnets 46 extend in the radial directions of the piston body 40. The magnets 46 have a thin, flat shape of which width in the X direction (dimension in the axial direction of the piston body 40) is less than the length (dimension in the circumferential direction of the piston body 40) and the width (dimension in the radial direction of the piston body 40).

As illustrated in FIG. 2, an outer end 46*a* of each magnet 46 is disposed at the corresponding cavity 58*c* of the holding member 44. In other words, the outer end 46*a* of each magnet 46 is disposed within the thickness of the circumferential portion 57. The outer ends 46*a* of the magnets 46 directly face the inner circumferential surface of the cylinder tube 12. The magnets 46 are, for example, ferrite magnets, rare earth magnets, plastic magnets, or the like.

The first yoke 47 has a circumferentially continuous ring shape with no gap. The first yoke 47 is disposed on one side of the plurality of magnets 46 in the axial direction (side facing the direction of the arrow X1). The outer diameter of the first yoke 47 is greater than the outer diameter of the first small diameter portion 40a2 of the first piston member 40a (bottom surface of the packing receiving groove 50). The first yoke 47 adjoins the end face of the first piston member 40a on the second piston member 40b side (end face facing the direction of the arrow X2). The inner circumferential surface of the first yoke 47 is located radially inward from inner ends 46b of the magnets 46. The outer circumferential surface of the first yoke 47 is located radially outward from the outer ends 46a of the magnets 46. The second small diameter portion 40b1 of the second piston member 40b is fitted in a hole portion of the first yoke 47.

The second yoke 48 has a circumferentially continuous ring shape with no gap. The second yoke 48 is disposed on another side of the plurality of magnets 46 in the axial direction (side facing the direction of the arrow X2). The outer diameter of the second yoke 48 is greater than the outer diameter of the second large diameter portion 40b2 of the second piston member 40b. The second yoke 48 adjoins the end face of the second piston member 40b on the first piston member 40a side (end face facing the direction of the arrow X1). The inner circumferential surface of the second yoke 48 is located radially inward from the inner ends 46b of the magnets 46. The outer circumferential surface of the second yoke 48 is located radially outward from the outer ends 46a of the magnets 46.

The second yoke 48 includes a ring-shaped adjoining portion 48a adjoining the plurality of magnets 46 and a ring-shaped axial portion 48b protruding from an outer circumferential part of the adjoining portion 48a in the axial direction (direction of the arrow X2) to be away from the first yoke 47. Thus, the second yoke 48 has an L-shaped cross-section. The second small diameter portion 40b1 of the second piston member 40b is fitted in a hole portion of the second yoke 48 (hole portion of the axial portion 48b). The circumferential portion 57 of the holding member 44 is supported by the outer circumferential surface of the axial portion 48b of the second yoke 48. That is, the circumferential portion 57 of the holding member 44 overlaps with the radially outer side of the axial portion 48b of the second yoke 48.

The constituent magnetic material of the first yoke 47 and the second yoke 48 includes, for example, soft magnetic materials such as stainless steel.

The plurality of magnets 46, the first yoke 47, and the second yoke 48 constitute the ring-shaped magnetic structural portion 49 producing a magnetic field around the entire circumference of the piston unit 18. The number of magnets 46 may be three or less or five or more. However, it is preferable that four or more magnets 46 be disposed to reliably produce a magnetic field around the entire circumference of the piston unit 18.

As illustrated in FIG. 2, a magnetic sensor 64 is attached to the outside of the cylinder tube 12. Specifically, a sensor bracket 66 is attached to one of the connecting rods 32 (see FIG. 1). The magnetic sensor 64 is held by the sensor bracket 66. Thus, the magnetic sensor 64 is secured in place with respect to the head cover 16 and the rod cover 14 via the sensor bracket 66 and the connecting rod 32. The magnetic sensor 64 detects magnetism generated by the magnets 46 to detect the working position of the piston unit 18.

The piston rod 20 is a columnar (circular cylindrical) member extending in the axial direction of the slide hole 13. The piston rod 20 passes through the rod cover 14. A leading end portion 20b of the piston rod 20 is exposed to the outside of the slide hole 13. A first cushion ring 69a is secured to an outer circumferential part of the piston rod 20 at a position on a side of the piston body 40 adjacent to the rod cover 14. A second cushion ring 69b is secured to the piston body 40 (second piston member 40b) on a side of the piston body 40 opposite the side on which the first cushion ring 69a lies to be coaxial with the piston rod 20.

The first cushion packing 68a, the second cushion packing 68b, the first cushion ring 69a, and the second cushion ring 69b constitute an air cushion mechanism reducing impact at stroke ends. Instead of or in addition to such an air cushion mechanism, dampers composed of an elastic material such as rubber may be attached to, for example, an inner wall surface 14a of the rod cover 14 and an inner wall surface 16a of the head cover 16.

The fluid pressure cylinder 10 configured as above operates as follows. In the description below, air (compressed air) is used as pressurized fluid. However, gas other than air may be used.

In FIG. 2, in the fluid pressure cylinder 10, the piston unit 18 is moved inside the slide hole 13 in the axial direction by the effect of the air serving as the pressurized fluid introduced via the first port 15a or the second port 15b. This causes the piston rod 20 connected to the piston unit 18 to move back and forth.

Specifically, to displace (advance) the piston unit 18 toward the rod cover 14, pressurized fluid is supplied from a pressurized fluid supply source (not illustrated) to the second pressure chamber 13b via the second port 15b while the first port 15a is exposed to the atmosphere. This causes the piston unit 18 to be pushed by the pressurized fluid toward the rod cover 14. Thus, the piston unit 18 is displaced (advanced) toward the rod cover 14 together with the piston rod 20.

As the piston unit 18 comes into contact with the rod cover 14, the advancing motion of the piston unit 18 stops. As the piston unit 18 approaches the advanced position, the first cushion ring 69a comes into contact with the inner circumferential surface of the first cushion packing 68a. This creates an airtight seal at the contact part and thus creates an air cushion in the first pressure chamber 13a. As a result, the displacement of the piston unit 18 in the vicinity of the stroke end on the rod cover 14 side is decelerated, and the impact occurring when the piston unit 18 reaches the stroke end is reduced.

On the other hand, to displace (return) the piston body 40 toward the head cover 16, pressurized fluid is supplied from the pressurized fluid supply source (not illustrated) to the first pressure chamber 13a via the first port 15a while the second port 15b is exposed to the atmosphere. This causes the piston body 40 to be pushed by the pressurized fluid toward the head cover 16. Thus, the piston unit 18 is displaced toward the head cover 16.

When the piston unit 18 comes into contact with the head cover 16, the returning motion of the piston unit 18 stops. As the piston unit 18 approaches the returned position, the second cushion ring 69b comes into contact with the inner circumferential surface of the second cushion packing 68b. This creates an airtight seal at the contact part and thus creates an air cushion in the second pressure chamber 13b. As a result, the displacement of the piston unit 18 in the vicinity of the stroke end on the head cover 16 side is decelerated, and the impact occurring when the piston unit 18 reaches the stroke end is reduced.

In this case, the fluid pressure cylinder 10 according to the first embodiment produces the following effects.

In the piston unit 18 of the fluid pressure cylinder 10, the plurality of magnets 46 are disposed at intervals in the circumferential direction by the holding member 44, and the ring-shaped first yoke 47 and the ring-shaped second yoke 48 are disposed on either side of the plurality of magnets 46. The plurality of magnets 46, the first yoke 47, and the second yoke 48 constitute the ring-shaped magnetic structural portion 49 producing a magnetic field around the entire circumference of the piston unit 18. Thus, a magnetic field can be produced around the entire circumference of the piston unit 18 without using a ring-shaped magnet. As a result, common magnets 46 can be used for fluid pressure cylinders with different cylinder diameters (piston diameters). That is, the size of the magnets 46 does not need to be changed depending on the cylinder diameter.

Moreover, according to the piston unit 18, the magnetic force can be adjusted while the thickness (axial dimension) is kept the same by changing the number of the magnets 46 to be disposed. Furthermore, the size of the magnets 46 with respect to the cylinder diameter is minimized as the cylinder diameter increases.

Each of the plurality of magnets 46 has a shape with a short axis and a long axis that are perpendicular to the axis of the piston body 40, and is held by the holding member 44 such that the long axis extends in the circumferential direction of the piston body 40. This structure eliminates or reduces circumferential unevenness in the magnetic flux density of the magnetic field produced outside the piston unit 18.

The number of the plurality of magnets 46 is four, and the plurality of magnets 46 are disposed at regular intervals in the circumferential direction. This structure facilitates production of a magnetic field of which magnetic flux density is uniform in the circumferential direction outside the piston unit 18.

The piston body 40 includes the plurality of piston members (the first piston member 40a and the second piston member 40b). The plurality of piston members form the ring-shaped accommodating groove 52 accommodating the plurality of magnet holding portions 58, the first yoke 47, and the second yoke 48. This structure enables the ring-shaped first yoke 47 and the ring-shaped second yoke 48 to be easily assembled on either side of the plurality of magnets 46 during assembly of the piston unit 18.

The one sidewall of the packing receiving groove 50 is formed by the outer circumferential part of the first piston member 40a. Moreover, the other sidewall of the packing receiving groove 50 is formed by the outer circumferential part of the first yoke 47. This structure facilitates assembly of the ring-shaped packing 42 and reduces the axial dimension of the piston body 40.

The second yoke 48 includes the adjoining portion 48a adjoining the plurality of magnets 46 and the ring-shaped axial portion 48b protruding from the outer circumferential part of the adjoining portion 48a in the axial direction to be away from the first yoke 47. This structure increases the circumferential area of the second yoke 48 to effectively increase the magnetic flux density of the magnetic field produced outside the piston unit 18.

The holding member 44 is supported by the outer circumferential surface of the axial portion 48b of the second yoke 48. This structure enables the holding member 44 to be supported in a preferred manner using the axial portion 48b.

The outer circumferential surface of the first yoke 47 and the outer circumferential surface of the second yoke 48 are located radially outward from the outer ends 46a of the plurality of magnets 46. This structure effectively increases the magnetic flux density of the magnetic field produced outside the piston unit 18.

The magnet holding portions 58 each have the cavity 58c opened in the outer circumferential surface of the holding member 44. This structure allows the magnets 46 to be disposed at positions close to the inner circumferential surface of the cylinder tube 12. Since the distance between the magnetic sensor 64 attached to the outside of the cylinder tube 12 and the magnets 46 disposed inside the cylinder tube 12 can be reduced, the magnetic force required for the magnets 46 can be reduced. Consequently, the axial thickness of the magnets 46 can be reduced, and thereby the axial dimension of the piston unit 18 can be reduced.

The holding member 44 is the wear ring 44A configured to prevent the piston body 40 from coming into contact with the cylinder tube 12. Thus, the holding member 44 serves both as the wear ring 44A and a member holding the magnets 46, leading to simplification of the structure.

Figure 4:
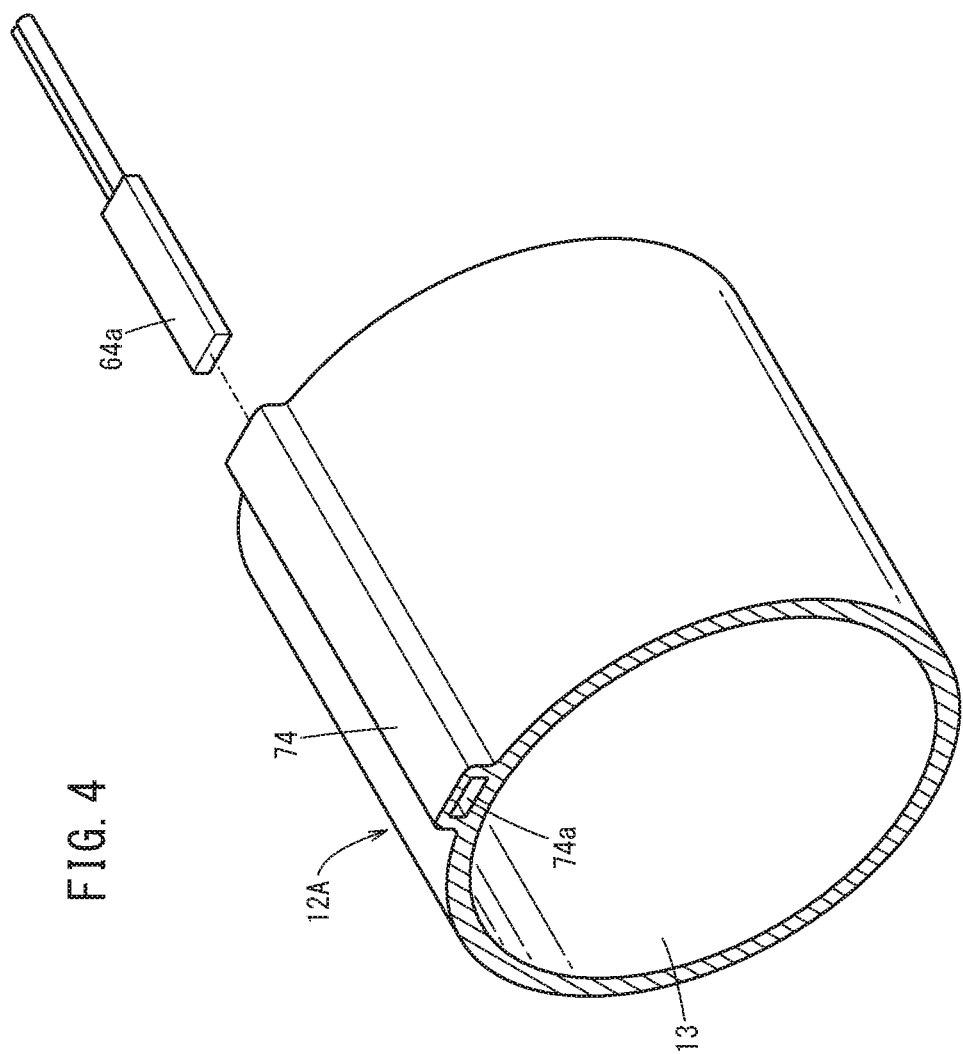
FIG. 4 is a perspective view of a cylinder tube according to another structure.

In the above-described fluid pressure cylinder 10, a cylinder tube 12A illustrated in FIG. 4 may be used instead of the cylinder tube 12. The cylinder tube 12A is provided with a protrusion 74 extending in the axial direction at a portion of an outer circumferential part of the cylinder tube 12A. A magnetic sensor receiving slot 74a is created inside the protrusion 74. A flat, thin (low-profile) magnetic sensor 64a is inserted into the magnetic sensor receiving slot 74a.

In the fluid pressure cylinder 10 using the cylinder tube 12A, the magnetic sensor 64a is inserted into the magnetic sensor receiving slot 74a created adjacent to the inner circumferential surface of the cylinder tube 12A. This enables the distance between the magnetic sensor 64a and the magnetic structural portion 49 including the plurality of magnets 46 (see FIG. 2, for example) to be further reduced. Consequently, the axial thickness of the magnet 46 can be reduced more effectively.

Figure 5:
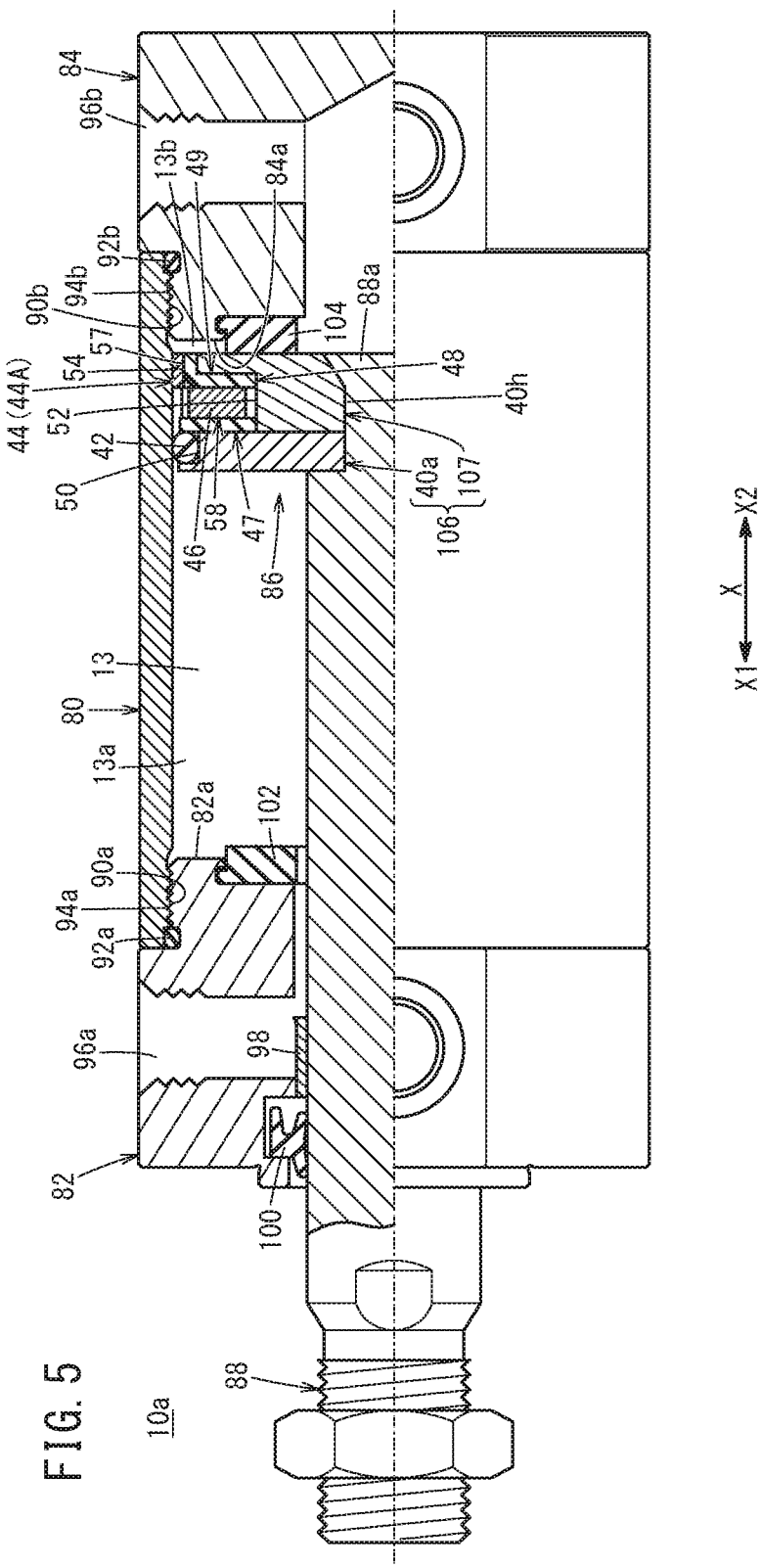
FIG. 5 is a partially sectioned side view of a fluid pressure cylinder according to a second embodiment of the present invention.

A fluid pressure cylinder 10a according to a second embodiment illustrated in FIG. 5 includes a hollow tubular cylinder tube 80 having the circular slide hole 13 inside the cylinder tube 80, a rod cover 82 disposed at one end part of the cylinder tube 80, a head cover 84 disposed at another end part of the cylinder tube 80, a piston unit 86 disposed inside the cylinder tube 80 to be movable in the axial direction (X direction), and a piston rod 88 connected to the piston unit 86.

The cylinder tube 80 has a hollow cylindrical shape. Internal thread portions 90a and 90b are formed on the inner circumferential surface of both end parts of the cylinder tube 80. Packings 92a and 92b with a circular ring shape are respectively disposed between the cylinder tube 80 and the rod cover 82 and between the cylinder tube 80 and the head cover 84.

Although not illustrated in detail, the magnetic sensor 64 (see FIG. 1, for example) is attached to the outer circumferential surface of the cylinder tube 80 at a freely selected position using a sensor mounting band. The sensor mounting band includes a sensor holder holding the magnetic sensor 64 and a band portion securing the sensor holder to an outer circumferential part of the cylinder tube 80.

An external thread portion 94a formed on the rod cover 82 engages with the internal thread portion 90a formed on the inner circumferential surface of the one end part of the cylinder tube 80. The rod cover 82 has a first port 96a. A bush 98 with a circular ring shape and a packing 100 with a circular ring shape are disposed in an inner circumferential part of the rod cover 82.

A damper 102 composed of an elastic material is attached to an inner wall surface 82a of the rod cover 82. An external thread portion 94b formed on the head cover 84 engages with the internal thread portion 90b formed on the inner circumferential surface of the other end part of the cylinder tube 80. The head cover 84 has a second port 96b. A damper 104 composed of an elastic material is attached to an inner wall surface 84a of the head cover 84.

The piston unit 86 includes a circular piston body 106 protruding radially outward from the piston rod 88, the packing 42 attached to an outer circumferential part of the piston body 106, the holding member 44 attached to the outer circumferential part of the piston body 106, the plurality of magnets 46 disposed in the outer circumferential part of the piston body 106 at intervals in the circumferential direction, and the first yoke 47 and the second yoke 48 disposed adjacent to the plurality of magnets 46.

The piston body 106 includes the first piston member 40a and a second piston member 107. The second piston member 107 differs from the second piston member 40b (FIG. 2) in that the second cushion ring 69b is not secured thereto. A base end portion 88a of the piston rod 88 is fitted in the through-hole 40h created in the piston body 106 and is secured by swaging. The piston body 106 and the piston rod 88 may be secured to each other by screwing instead of swaging.

The fluid pressure cylinder 10a according to the second embodiment also produces effects similar to the effects of the fluid pressure cylinder 10 according to the first embodiment.

The present invention is not limited in particular to the embodiments described above, and various modifications can be made thereto without departing from the scope of the present invention. For example, the cylinder tubes 12 and 80 and the piston units 18 and 86 with circular transverse sections are used in the above-described embodiments. However, the present invention is not limited to this, and cylinder tubes and piston units with non-circular (elongated circular, elliptical, polygonal, or the like) transverse sections may be used.

The invention claimed is:

1. A piston unit reciprocable along a slide hole created in a cylinder tube, the piston unit comprising:
    a piston body;
    a packing attached to an outer circumferential part of the piston body;
    a holding member attached to the outer circumferential part of the piston body and including a plurality of magnet holding portions disposed in a circumferential direction;
    a plurality of magnets held by the plurality of magnet holding portions at intervals in the circumferential direction;
    a first yoke with a ring shape disposed on one side of the plurality of magnets in an axial direction; and
    a second yoke with a ring shape disposed on another side of the plurality of magnets in the axial direction,
    wherein the second yoke includes:
    an adjoining portion adjoining the plurality of magnets; and
    an axial portion having a ring shape and protruding from an outer circumferential part of the adjoining portion in the axial direction to be away from the first yoke.

2. The piston unit according to claim 1, wherein the holding member is supported by an outer circumferential surface of the axial portion of the second yoke.

3. The piston unit according to claim 1, wherein an outer circumferential surface of the first yoke and an outer circumferential surface of the second yoke are located outward from an outer end of each of the plurality of magnets.

4. The piston unit according to claim 1, wherein the holding member is a wear ring configured to prevent the piston body from coming into contact with the cylinder tube.

5. The piston unit according to claim 1, wherein:
    a number of the plurality of magnets is four; and
    the plurality of magnets are disposed at regular intervals in the circumferential direction.

6. The piston unit according to claim 1, wherein:
    the piston body includes a plurality of piston members; and
    the plurality of piston members form a ring-shaped accommodating groove accommodating the plurality of magnet holding portions, the first yoke, and the second yoke.

7. The piston unit according to claim 6, wherein:
    a packing receiving groove, which has a ring shape and to which the packing is attached, is formed in the outer circumferential part of the piston body;
    one sidewall of the packing receiving groove is formed by the piston body; and
    another sidewall of the packing receiving groove is formed by an outer circumferential part of the first yoke.

8. A piston unit reciprocable along a slide hole created in a cylinder tube, the piston unit comprising:
    a piston body;
    a packing attached to an outer circumferential part of the piston body;
    a holding member attached to the outer circumferential part of the piston body and including a plurality of magnet holding portions disposed in a circumferential direction;
    a plurality of magnets held by the plurality of magnet holding portions at intervals in the circumferential direction;
    a first yoke with a ring shape disposed on one side of the plurality of magnets in an axial direction; and
    a second yoke with a ring shape disposed on another side of the plurality of magnets in the axial direction,
    wherein the magnet holding portions each have a cavity opened in an outer circumferential surface of the holding member.

9. A fluid pressure cylinder comprising:
    a cylinder tube having a slide hole inside the cylinder tube;
    a piston unit disposed to be reciprocable along the slide hole; and
    a piston rod protruding from the piston unit in an axial direction, wherein
    the piston unit includes:
    a piston body;
    a packing attached to an outer circumferential part of the piston body;
    a holding member attached to the outer circumferential part of the piston body and including a plurality of magnet holding portions disposed in a circumferential direction;
    a plurality of magnets held by the plurality of magnet holding portions at intervals in the circumferential direction;

a first yoke with a ring shape disposed on one side of the plurality of magnets in the axial direction; and a second yoke with a ring shape disposed on another side of the plurality of magnets in the axial direction, wherein the holding member includes a circumferential portion which extends in the circumferential direction along the outer circumferential part of the piston body, the plurality of the magnet holding portions protrude inward from the inner circumferential surface of the circumferential portion, and the second yoke includes:

an adjoining portion adjoining the plurality of magnets; and an axial portion having a ring shape and protruding from an outer circumferential part of the adjoining portion in the axial direction to be away from the first yoke.

* * * * *